United States Patent
Mueller

(10) Patent No.: US 7,136,807 B2
(45) Date of Patent: Nov. 14, 2006

(54) INFERENCING USING DISAMBIGUATED NATURAL LANGUAGE RULES

(75) Inventor: Erik T. Mueller, Chevy Chase, MD (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 10/228,122

(22) Filed: Aug. 26, 2002

(65) Prior Publication Data

US 2004/0039564 A1    Feb. 26, 2004

(51) Int. Cl.
*G06F 17/27* (2006.01)

(52) U.S. Cl. .................... 704/9; 706/8; 706/60; 700/49
(58) Field of Classification Search .................... 704/9; 700/49; 706/8, 60

See application file for complete search history.

(56) References Cited

U.S. PATENT DOCUMENTS

| | | | | |
|---|---|---|---|---|
| 4,970,658 | A * | 11/1990 | Durbin et al. | 706/60 |
| 5,694,523 | A * | 12/1997 | Wical | 706/45 |
| 5,940,821 | A * | 8/1999 | Wical | 707/3 |
| 6,076,051 | A * | 6/2000 | Messerly et al. | 704/9 |
| 6,405,162 | B1 * | 6/2002 | Segond et al. | 704/9 |
| 6,675,159 | B1 * | 1/2004 | Lin et al. | 707/3 |
| 6,965,857 | B1 * | 11/2005 | Decary | 704/1 |
| 2002/0116170 | A1 * | 8/2002 | Corman et al. | 704/9 |
| 2003/0172368 | A1 * | 9/2003 | Alumbaugh et al. | 717/106 |
| 2003/0217052 | A1 * | 11/2003 | Rubenczyk et al. | 707/3 |
| 2004/0024584 | A1 * | 2/2004 | Brill | 704/9 |
| 2004/0117395 | A1 * | 6/2004 | Gong et al. | 707/101 |

OTHER PUBLICATIONS

Cardie, C. "Corpus-based acquisition of relative pronoun disambiguation heuristics," Proceedings of the 30th Meeting of the Association for Computational Linguistics, pp. 216-223, 1992.*

(Continued)

*Primary Examiner*—Tālivaldis Ivars Šmits
*Assistant Examiner*—Eunice Ng
(74) *Attorney, Agent, or Firm*—Gibb I.P. Law Firm, LLC; Derek S. Jennings

(57) ABSTRACT

A method and structure for automatically producing bridging inferences that join two related input sentences, by applying a lexicon and ontology data structure to a first input sentence to produce first input tagged sentences, applying the lexicon and ontology data structure to a second input sentence to produce second input tagged sentences, matching each first input tagged sentence to first rules, generating first inferred tagged sentences from the first rules, matching the first inferred tagged sentences to second rules, generating second inferred tagged sentences from the second rules, matching the second inferred tagged sentences to third rules, generating third inferred tagged sentences from the third rules, and so on, until a final inferred tagged sentence matches any second input tagged sentence. For each final inferred tagged sentence matching a second input tagged sentence, a bridging inference path is produced as output comprising a first input tagged sentence, a first inferred tagged sentence, a second inferred tagged sentence, a third inferred tagged sentence, and so on, and a final inferred tagged sentence. The first inferred tagged sentence in the briding inference path is the particular first inferred tagged sentence that resulted from application of a first rule to the first input tagged sentence. For the second through the last inferred tagged sentences in the bridging inference path, each inferred tagged sentence in the bridging inference path is the particular inferred tagged sentence that resulted from application of a rule to the previous inferred tagged sentence in the bridging inference path.

28 Claims, 5 Drawing Sheets

OTHER PUBLICATIONS

Fujito, et al. "Toward the logical formalization of approximate reasoning," Proceedings of the 5th IEEE International Conference on Fuzzy Systems, vol. 2, pp. 892-898, New Orleans, LA, Sep. 8-11, 1996.*

Correa, N. "A binding rule of government-binding parsing," COLING '88, Budapest, Hungary, vol. 1, pp. 123-129, 1998.*

Charniak et al. "Introduction to artificial intelligence," Addison-Wesley Publishing Co., 1985, pp. 504-505.*

Clark et al. "A knowledge-driven approach to text meaning processing," Proceedings of the HLT Workshop on Text Meaning Processing, pp. 1-6, ACL Press.*

Anick et al. "Lexical structures for linguistic inference," Lexical Semantics and Knowledge Representation, Special Interest Group on the Lexicon of the ACL, 1991, pp. 102-112.*

Mueller, E. "Story understanding through multi-representation model construction," Text Meaning: Proceedings of the HLT-NAACL 2003 Workshop, East Stroudsburg, PA, pp. 46-53, Association for Computational Linguistics.*

"Knowledge Processing on an Extended WordNet", Sanda M. Harabagiu and Dan I. Moldovan, Chapter 16, pp. 379-405.

"The Public Acquisition of Commonsense Knowledge", Push Singh, MIT Media Lab, American Association for Artificial Intelligence, pp. 1-6.

"Unified Theory of Inference for Text Understanding", Peter Norvig, Report No. USB/CSD 87/339, Jan. 1987, Computer Science Division (EESCS) University of California, pp. 1-161.

* cited by examiner

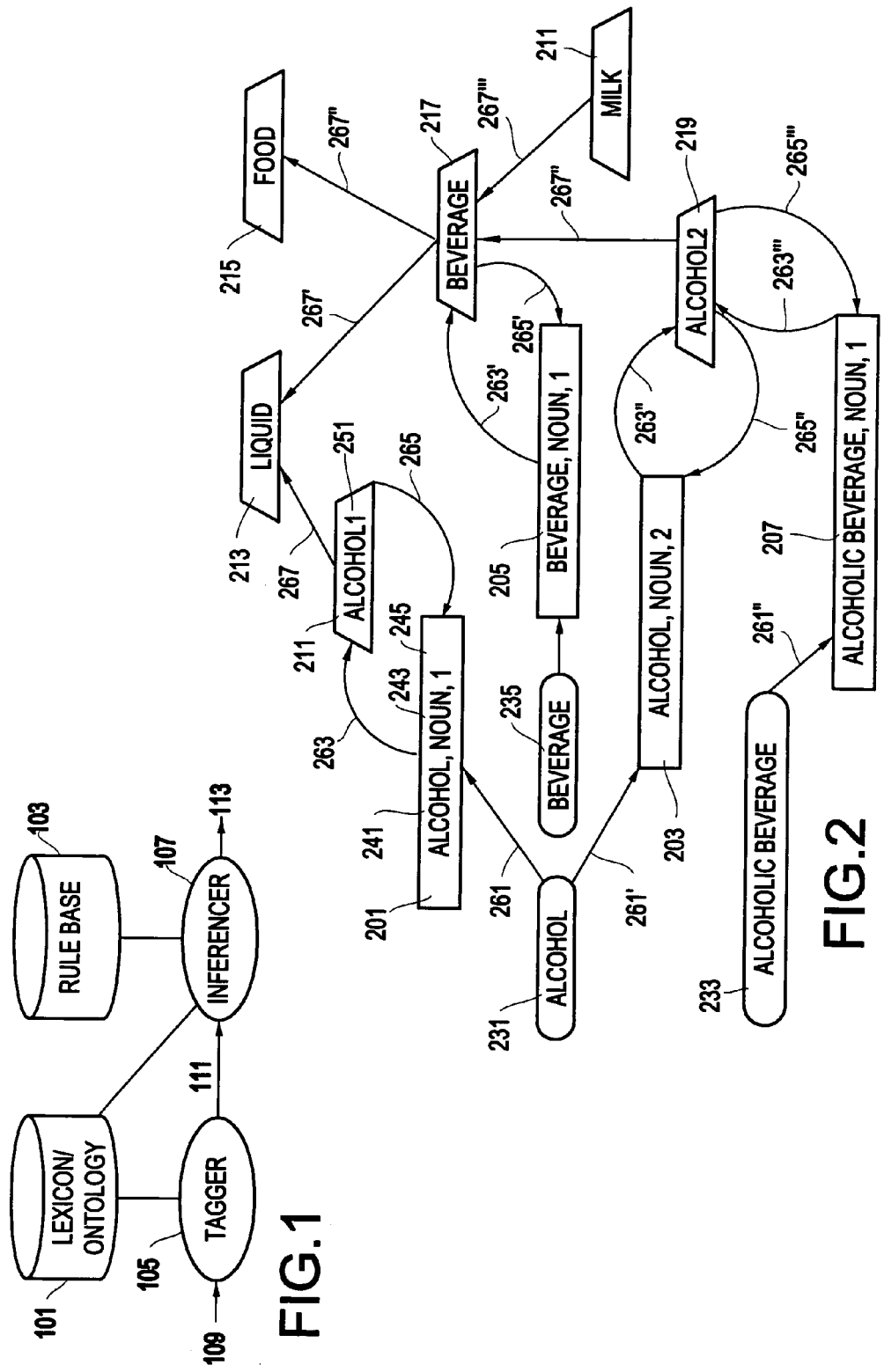

INFERENCING USING DISAMBIGUATED NATURAL LANGUAGE RULES

BACKGROUND OF THE INVENTION

1. Field of the Invention

The invention relates to natural language processing, commonsense reasoning, and knowledge representation. In particular, the invention relates to the representation of commonsense knowledge and processing mechanisms for the generation of bridging and predictive inferences from natural language text.

2. Description of the Related Art

People are most comfortable communicating in a natural language such as English, yet natural language is notoriously ambiguous and thus difficult for computers to understand. FAUSTUS (Norvig, 1987) is computer program implementing a unified approach to natural language inference. The program uses marker passing to perform six general types of inferences. The algorithm consists of translating input text into a semantic network representation (nodes and links), performing marker passing starting from the nodes of the input network, when a marker collision occurs, suggesting inferences based on the paths taken by the markers, and evaluating the suggested inferences. (e.g., see, Norvig, Peter (1987). *Unified theory of inference for text understanding* (Report No. UCB/CSD 87/339). Berkeley, Calif.: University of California, Computer Science Division).

Extended WordNet (XWN) (Harabagiu & Moldovan, 1998) is a commonsense knowledge base being constructed by parsing the English glosses (definitions) provided with WordNet, an online lexical database, into directed acyclic graphs. A sample graph is: refrigerator—GLOSSY→appliance←LOCATION—store—OBJECT→food which was parsed out of the gloss for refrigerator: "an appliance where food is stored." (e.g. see, Harabagiu, Sanda M., & Moldovan, Dan I. (1998). Knowledge processing on an extended WordNet. In Fellbaum, Christiane (Ed.), *WordNet: An electronic lexical database* (pp. 379–405). Cambridge, Mass.: MIT Press. http://www.seas.smu.edu/~sanda/papers/wnb1.ps.gz).

The Open Mind Common Sense project (Singh, 2002) is building a database of English sentences that describe commonsense knowledge. The sentences are entered by contributors via the Internet. A sample of such sentence contributions is: "One type of book is a calendar book."; "One of the things you do when you plan a vacation is get out the map."; "The ice age was long ago."; "A writer writes for a living."; "Something that might happen as a consequence of having a heart attack is vice Presidency."; "A machinist can machine parts."; and "Walking is for relaxation." (e.g., see, Singh, Push (2002). The public acquisition of commonsense knowledge. *In Proceedings of the AAAI Spring Symposium on Acquiring (and Using) Linguistic (and World) Knowledge for Information Access*. Palo Alto, Calif.: American Association for Artificial Intelligence.)

In FAUSTUS, knowledge is represented in a verbose semantic network whose nodes represent concepts. Knowledge is open-ended and coded in an expressive representation language that "encourages a proliferation of concepts" (Norvig, 1987, p. 73). Thus, the problems with FAUSTUS are that knowledge entry is time consuming and that knowledge entry must be performed by knowledge representation experts.

XWN is a knowledge base designed around WordNet glosses. It is a knowledge base of ways of expanding or rewriting concepts. As a result, XWN has significant limitations in what it can represent. XWN does not support representations of plans (Harabagiu & Moldovan, 1998, p. 399), which are essential for natural language understanding and XWN does not support representation of causal rules, which are also essential for natural language understanding. For example, it is difficult to represent as an XWN graph the fact that pouring water on a fire causes the fire to go out. An attempt might be:

pour—OBJECT→water—DESTINATION→fire—CAUSED→fire—ATTRIBUTED→extinguished

However, this fails to capture the fact that both fires are the same. (Furthermore, CAUSE and DESTINATION are not relations derived from the WordNet glosses.) The fire nodes cannot be merged, because the graph would then assert that pouring water on an extinguished fire causes the extinguished fire.

Since Open Mind Common Sense is a collection of English sentences describing commonsense knowledge, the database is potentially relevant to many natural language understanding tasks. The first problem with Open Mind Common Sense is that the sentences are ambiguous as to part of speech and word sense. For example with the sentence "People can pay bills." it is not specified whether bills is a noun or a verb, and bills is ambiguous as to whether it refers to statutes, invoices, banknotes, beaks, sending an invoice, and so on. The second problem is that the Open Mind Common Sense sentences are ambiguous as to coreference. For example with the sentence "A garbage truck picks up garbage and hauls it to the dump." it is ambiguous as to whether it refers to garbage truck or garbage. The third problem is that the same type of rule can be expressed in many ways in English, so generation of inferences using English sentences is a difficult problem.

SUMMARY OF THE INVENTION

The invention comprises a system and method for generating natural language bridging and predictive inferences with the following features: the knowledge entry is quick, the knowledge entry can be performed by nonspecialists (automated), the knowledge is unambiguously represented, and the generation of bridging and predictive inferences is efficient using the knowledge. Another benefit of the invention is that input text is disambiguated as to part of speech, word sense, and coreference.

The invention automatically produces bridging inferences that join two related input sentences, by applying a lexicon and ontology data structure to a first input sentence to produce first input tagged sentences, applying the lexicon and ontology data structure to a second input sentence to produce second input tagged sentences, matching each first input tagged sentence to first rules, generating first inferred tagged sentences from the first rules, matching the first inferred tagged sentences to second rules, generating second inferred tagged sentences from the second rules, matching the second inferred tagged sentences to third rules, generating third inferred tagged sentences from the third rules, and so on, until a final inferred tagged sentence matches any second input tagged sentence. For each final inferred tagged sentence matching a second input tagged sentence, a bridging inference path is produced as output comprising a first input tagged sentence, a first inferred tagged sentence, a second inferred tagged sentence, a third inferred tagged sentence, and so on, and a final inferred tagged sentence. The first inferred tagged sentence in the briding inference path is the particular first inferred tagged sentence that resulted from application of a first rule to the first input tagged sentence. For the second through the last inferred tagged sentences in the bridging inference path, each inferred tagged sentence in the bridging inference path is the particular inferred tagged sentence that resulted from application of a rule to the previous inferred tagged sentence in the bridging inference path. In other words, the invention makes explicit the implied relationship between two input sentences.

The rules have a first portion, a connector, and a second portion. The first portion and the second portion consist of a sequence of natural language words or phrases. The connectors include "causes," "triggers," and "has-plan." The first portion and the second portion are disambiguated as to part of speech, word sense and coreference.

The lexicon and ontology data structure has one or more lexical entries, concepts, and character strings. The lexicon and ontology data structure has one-to-many maps from character strings to lexical entries, one-to-one maps from lexical entries to concepts, one-to-many maps from concepts to lexical entries, and one-to-many maps from concepts to parent concepts.

In addition, the invention automatically produces bridging inferences that join two related input sentences, by applying a lexicon and ontology data structure to a first input sentence to produce first input tagged sentences, applying the lexicon and ontology data structure to a second input sentence to produce second input tagged sentences, matching every first input tagged sentence to first rules, generating first inferred tagged sentences from first rules, matching every second input tagged sentence to last rules, generating last inferred tagged sentences from last rules, matching first inferred tagged sentences to second rules, generating second inferred tagged sentences from second rules, matching last inferred tagged sentences to next to last rules, generating next to last inferred tagged sentences from next to last rules, and so on, until an inferred tagged sentence derived from the first input sentence matches an inferred tagged sentence derived from the second input sentence, and recording, for each inferred tagged sentence derived from the first input sentence matching an inferred tagged sentence derived from the second input sentence. A bridging inference path comprises one of the first input tagged sentences, one of the first inferred tagged sentences, one of the second inferred tagged sentences, and so on, one of the next to last inferred tagged sentences, one of the last inferred tagged sentences, and one of the second input tagged sentences. The first inferred tagged sentence in the briding inference path is the particular first inferred tagged sentence that resulted from application of a first rule to one of the first input tagged sentences. The second inferred tagged sentence in the briding inference path is the particular second inferred tagged sentence that resulted from application of a second rule to the first inferred tagged sentence, and so on. The next to last inferred tagged sentence is the particular next to last inferred sentence that resulted from application of a next to last rule to the last sentence in the bridging inference path, and the last sentence in the bridging inference path is one of the second input tagged sentences.

In addition, the invention automatically produces predictive inferences from an input sentence, by applying a lexicon and ontology data structure to an input sentence to produce a tagged input sentence, matching the tagged input sentence to rules, and generating an inferred tagged sentence for each matching rule.

The invention is useful for computer applications, such as online and standalone applications, that incorporate natural language interactions with a user. The invention enables bridging and predictive inferences to be made that are useful for understanding the customer's situation in order to provide useful responses such as retrieved information or recommended products, services, and solutions. The invention enables the user's goals to be inferred that allow an application to retrieve information and suggest products useful for satisfying those goals.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 1 is a block diagram illustrating the method of the invention.

FIG. 2 is a drawing of a sample portion of a Lexicon and Ontology.

DETAILED DESCRIPTION OF PREFERRED EMBODIMENTS OF THE INVENTION

Figure 3:
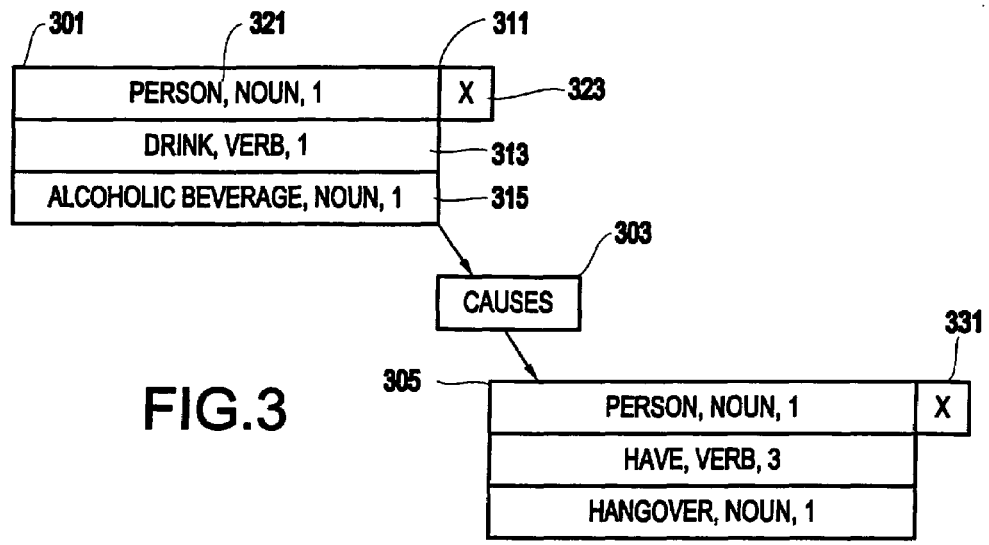
FIG. 3 is a drawing of a sample rule in a Rule Base.

Bridging inferences are useful in any natural language interaction system (voice portals, text portals, search engines, and customer relationship management systems) when the user neglects to provide the connection between two sentences or parts of sentences and where those sentences or parts of sentences may optionally contain word sense or coreference ambiguities.

For example one input may be "My friend drank vodka. He put an ice pack on his head." The unstated bridging inference is the user's friend has a hangover. As explained below, the invention automatically produces such bridging inferences and records paths of rules to form such bridging inferences. The coreference disambiguation is that "he" refers to the user's friend. The output action is to bring up a complete list of hangover remedies.

In another example the input is "I'm hungry. I'm getting my car keys." The bridging inference is that the user is eating out. The word sense disambiguation is that "key" refers to metal device, not pitch. The output action is to display a list of nearby restaurants.

In addition to bridging inferences, the invention also produces predictive inferences that are useful in natural language interaction systems when the user neglects to provide the consequences of a sentence or where the sentence or parts of the sentence contain part of speech, word sense, or coreference ambiguities. For example, with the input: "I'm hungry." the output predictive inference is that the user wants to eat, and the action is to display a list of nearby restaurants.

The invention provides the representation of knowledge using rules comprising two natural language sentences that are linked by a connective. The natural language sentences are disambiguated as to part of speech, word sense and coreference of lexical entries within one sentence or across the two sentences.

Referring to FIG. 1, the invention includes a Lexicon and Ontology 101, Rule Base 103, Tagger 105, and Inferencer 107. The invention takes sentences 109 as input, which are tagged by the Tagger 105 and sent 111 to the Inferencer 107. The inference produces disambiguated versions of the input sentences and inferences 113 as output.

Referring to FIG. 2, the Lexicon and Ontology 101 contains one or more lexical entries 201, 203, 205, 207; one or more concepts 211, 213, 215, 217, 219, 221; and one or more character strings 231, 233, 235. A lexical entry (e.g., 201) comprises a character string 241, part of speech 243, and sense number 245. A lexical entry represents a unique combination of word or phrase, part of speech, and sense as defined by a corresponding concept. For example, several lexical entries correspond to the word "alcohol": lexical entry 201 with character string "alcohol", part of speech Noun, and sense number 1 corresponding to the concept ALCOHOL1 211, which represents the chemical substance alcohol, and lexical entry 203 with character string "alcohol", part of speech Noun, and sense number 2 corresponding to the concept ALCOHOL2 219, which represents an alcoholic beverage. A part of speech can be, for example: Adjective, Adverb, Conjunction, Determiner, Interjection, Noun, Preposition, Pronoun, Verb, etc. The sense number is an integer.

Each concept (e.g., 211) comprises a character string 251. For example, the character string 251 uniquely identifies a concept node, and the character string may be descriptive of the meaning of the concept for readability.

The Lexicon and Ontology 101 also contains many maps. One mapping 261, 261', etc. maps a character string to a list of lexical entries (e.g., string-to-lexicon (StrToLex) maps). Another mapping 263, 263', etc. maps a lexical entry to a concept (e.g., lexicon-to-concept (LexToCon)). Yet another mapping 265, 265', etc. maps a concept to a list of lexical entries (e.g., concept-to-lexicon (ConToLex)). A parent mapping 267, 267', etc. maps a concept to a list of concepts.

The Rule Base 103 contains one or more rules, as shown in FIG. 3. A rule includes a left pattern 301, a connective 303, and a right pattern 305. A connective 303 is a logical link expression such as: causes, triggers, or has-plan. A pattern 301 includes a list of pattern elements 311, 313, 315. A pattern element comprises a lexical entry 321 and an optional variable 323. The optional variable of a first pattern element is a character string that uniquely identifies what other pattern elements contained in either or both of the patterns of the rule exhibit coreference with the first pattern element, that is, refer to the same world entity. For example, the pattern element 311 and the pattern element 331 exhibit coreference, that is, refer to the same person, because they both contain the variable "x".

Figure 4:
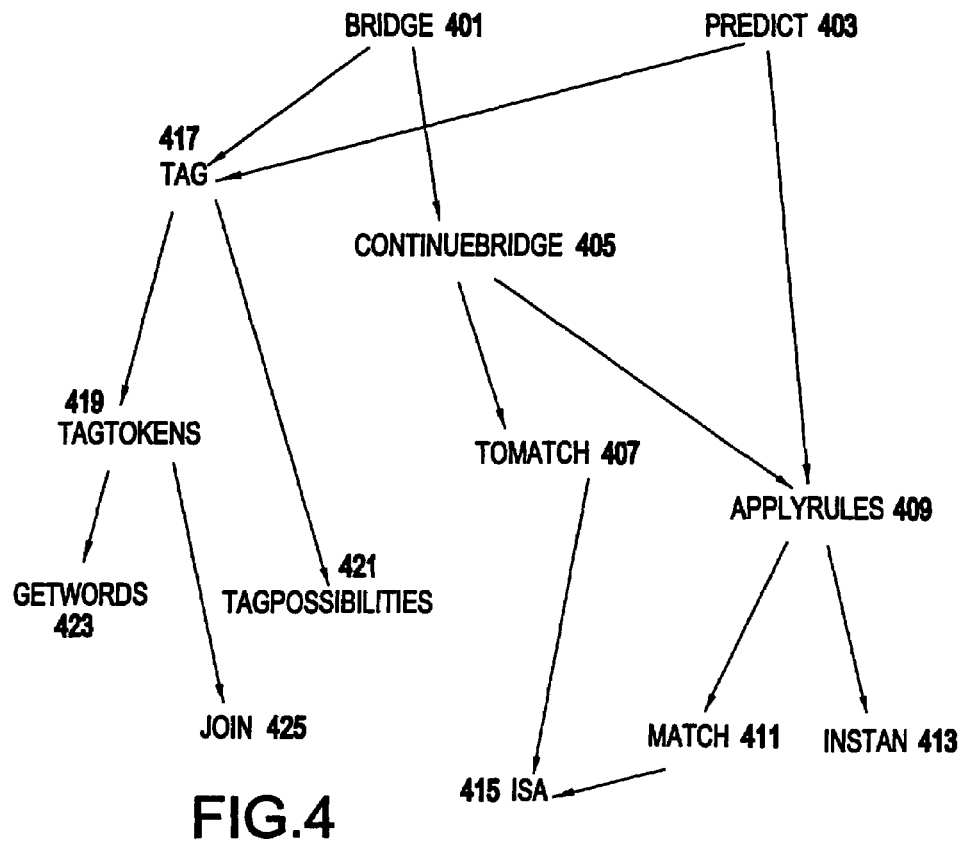
FIG. 4 is a drawing of the procedures in an embodiment of the invention.
Figure 5:
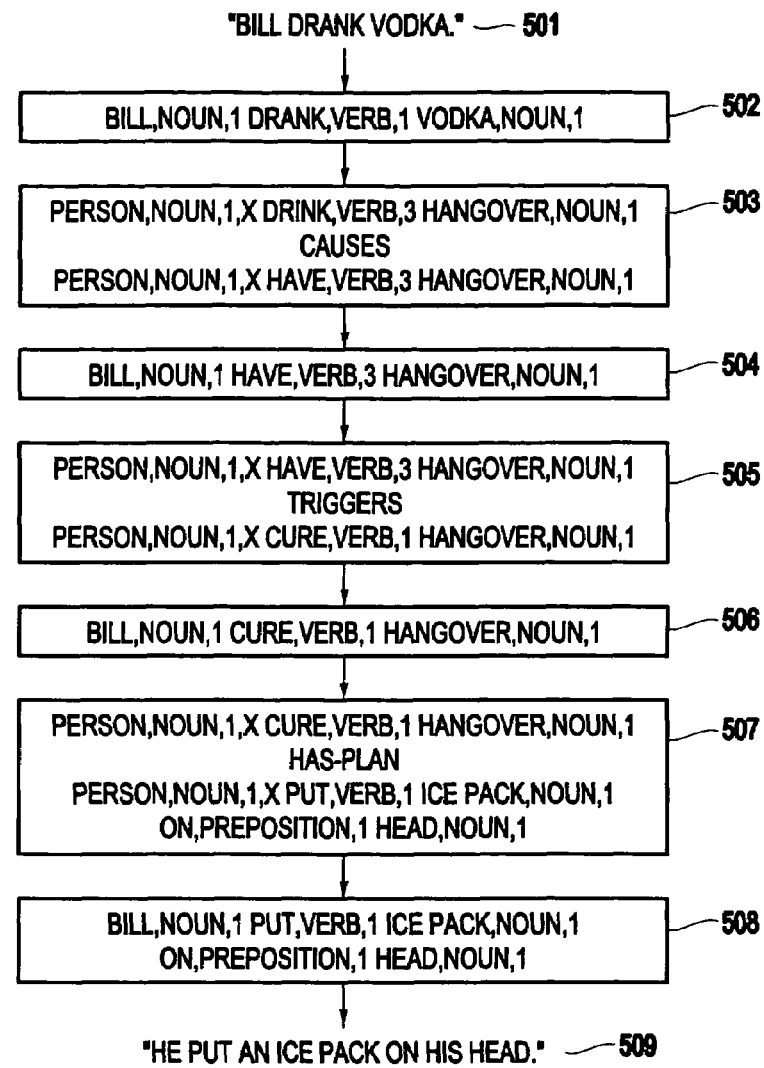
FIG. 5 is a drawing of sample data structures involved in a bridging inference.
Figure 6:
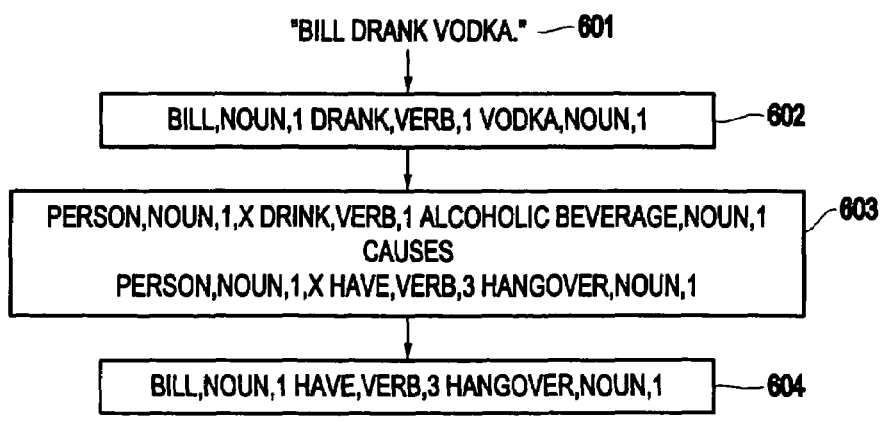
FIG. 6 is a drawing of sample data structures involved in a predictive inference.

Referring to FIG. 4, the operations of the tagger 109 and inferencer 107 are shown in greater detail. The operations of the tagger 109 can be seen in items such as tag 417, tagtokens 419, etc. The operations of the inferencer 107 include the procedures bridge 401 and predict 403. More specifically, the procedure bridge 401 generates bridging inferences (as shown in FIG. 5) and the predict 403 generates predictive inferences (as shown in FIG. 6).

The bridge operation 401 invokes the tag 417 and continuebridge 405 operations. Bridge 401 performs a unidirectional depth-first search to generate bridging inferences. Bridge 401 invokes tag 417 on the first input sentence to produce first input tagged sentences, invokes tag 417 on the second input sentence to produce second input tagged sentences, and feeds these first and second input tagged sentences to continuebridge 405, which returns bridging inferences. A tagged sentence comprises a list of lexical entries. Tag 417 takes input sentences and produces tagged sentences. Continuebridge 405 applies rules to first input or inferred tagged sentences to produce new tagged sentences and recursively invokes itself 405 on those new tagged sentences until tagged sentences match tagged second input sentences. Predict 403 also invokes the tag operation 417 and an applyrules 409 operation. Predict 403 invokes tag 417 on the input sentence to produce input tagged sentences and then applies rules to those tagged sentences to produce new tagged sentences representing predictive inferences. Applyrules 409 determines which rules match a tagged sentence, applies those rules to the tagged sentence, and returns the new tagged sentences that result from the application of those rules. The tag operation 417 invokes tagtokens 419 and tagpossibilities 421 operations. Tagtokens 419 identifies sequences of words in a character string that match lexical entries in the Lexicon and Ontology 101. Tagpossibilities 421 creates all possible tagged sentences given a list of lexical entries collected by tagtokens 419. The tagtokens operation 419 invokes getwords 423 and join 425 operations. Getwords 423 returns a list of words in a character string. Join 425 concatenates specified adjacent words in a list of words. A continuebridge 405 operation invokes tomatch 407 and applyrules 409 operations. Tomatch 407 determines whether two tagged sentences match each other. Applyrules 409 determines which rules apply to a tagged sentence, applies them, and returns the new tagged sentences resulting from the application of the rules. A tomatch 407 operation invokes an isa 415 operation. Isa 415 determines whether one concept is a kind of another concept (e.g., ALCOHOL2 219 is a FOOD 215). Applyrules 409 invokes match 411 and instan 413 operations. Match 411 determines whether a pattern matches a tagged sentence and returns the bindings that enabled the match to succeed. Instan 413 takes bindings resulting from match 411 and a pattern, and produces a new tagged sentence. The match operation 411 invokes an isa operation 415.

For example, given a character string s, tag(s) 417 would be defined as tagpossibilities (tagtokens(s)). Given a character string s, tagtokens(s) 419 returns a list of tokens, where a token comprises a lexical entry, start index, and an end index. An index is an integer specifying the start and end location of the word in the sentence. Zero-origin indexing is employed throughout this description. Thus, given a sentence "John got an alcoholic beverage", the start index of "John" is 0, the end index of "John" is 1, the start index of "alcoholic beverage" is 3, and the end index of "alcoholic beverage" is 5.

Tagtokens(s) 419 returns a list of tokens representing all words or phrases in s that are recognized as lexical entries. An invocation of tagtokens 419 on s starts by setting result to the empty list. It sets words to the result of invoking getwords 423 on s. It sets i to 0. While i is less than the length of words, (a) it sets j to the maximum number of words in a lexical entry, (b) while j is greater than 0, (a') if (i+j) is less than or equal to the length of words, then for each lexentry in StrToLex (the result of invoking join 425 on words, i, and i+j), it appends <lexentry, i, i+j> to result, (b') it sets j to j−1, (c) it sets i to i+1. In other words, in this process tagtokens 419 identifies sequences of words in a character string that match lexical entries in the Lexicon and Ontology 101.

An invocation of getwords 423 on a character string s returns a list of the words in s, where a word is defined as a sequence of one or more letters or digits taken from s. In other words, the invention determines that, if there is a nonalphanumeric character, such as a space, between two adjoining strings of characters, then these two strings of characters are actually two separate words. However, several such adjacent words may later be recognized by tagtokens 419 as a phrase such as "alcoholic beverage." An invocation of join 425 on words, starti, and endi returns a character string comprising the words starting at index starti and stopping at index endi−1, where the words are separated by a single space.

Given a list of tokens, the tagpossibilities operation 421 returns one or more tagged sentences, each comprising a list of lexical entries. In other words, an input sentence is first broken down into individual words, and then sequences of one or more words are recognized as words or phrases in the lexicon with particular parts of speech (e.g., noun, verb, etc.) and sense numbers.

An invocation of tagpossibilities 421 on tokens proceeds as follows. If the length of tokens is 0, then it returns an empty list. It sets results to the empty list. It sets starti to 0. It sets maxstarti to the greatest start index in tokens. While starti is less than or equal to maxstarti, (a) it sets nexttokens to the empty list, (b) for each token in tokens, if starti equals the start index of token then it appends token to nexttokens, (c) if nexttokens is not empty, then if result is empty. Then (a') for each nexttoken in nexttokens, it appends to result a list comprising only of nexttoken, otherwise (b') it sets result1 to the empty list and for each e in result (a"). It sets found to false, (b") for each nexttoken in nexttokens, if the end index of the last element of e is less than or equal to the start index of nexttoken. Then (a''') it sets e1 to a copy of e, (b''') it appends nexttoken to e1, (c''') it appends e1 to result1, and (d''') it sets found to true, (c") if found is false, then it appends e to result1, and (c') it sets result to result1, and (d) it sets starti to starti+1. It sets result2 to the empty list. For each e in result, (a) it sets result3 to the empty list, (b) for each f in e, it appends to result3 the lexical entry of f, and (c) it appends result3 to result2. It returns result2. In other words, in this process tagpossibilities 421 creates all possible tagged sentences given a list of tokens from tagtokens 419.

Tagpossibilities 421 returns possible lists of lexical entries corresponding to all possible lists of contiguous tokens. For example, if the tokens are <<John, Noun, 1>, 0, 1>; <<John, Noun, 2>, 0, 1>; <<drank, Verb, 1>, 1, 2>; and <<drank, Verb, 2>, 1, 2>; then the Tagpossibilities 421 operation returns: (<John, Noun, 1>, <drank, Verb, 1>); (<John, Noun, 2>, <drank, Verb, 1>); (<John, Noun, 1>, <drank, Verb, 2>); and (<John, Noun, 2>, <drank, Verb, 2>).

Given character strings fromstring and tostring, bridge (fromstring, tostring) 401 returns a list of bridges, where each bridge comprises a bridgefrom, bridgeto, and path. A bridgefrom is a tagged sentence corresponding to fromstring and a bridgeto is a tagged sentence corresponding to tostring. Using the above example, fromstring would be "Bill drank vodka" and tostring would be "He put an ice pack on his head." A path (e.g., series of bridging inferences) is a list of tagged sentences that form a logical connection from the bridgefrom tagged sentence to the bridgeto tagged sentence (e.g., see FIG. 5, discussed below). The path is automatically generated by the invention. Bridgefrom is the first input sentence (fromstring) disambiguated as to word sense. Bridgeto is the second input sentence (tostring) disambiguated as to word sense. The first element of the path is fromstring disambiguated as to word sense. The last element of the path is tostring disambiguated as to part of speech, word sense, and coreference. The path is the bridging inference chain.

An invocation of bridge 401 on fromstring and tostring starts by setting the result to the empty list. It sets bridgefroms to the result of invoking tag 417 on fromstring. It sets bridgetos to the result of invoking tag 417 on tostring. For each bridgefrom in bridgefroms, for each bridge in the result of invoking continuebridge 405 on bridgefrom, bridgefrom, bridgetos, the empty list, and the empty list, it appends bridge to result. In other words, in this process bridge 401 invokes tag 417 on the first input sentence to produce first input tagged sentences, invokes tag 417 on the second input sentence to produce second input tagged sentences, and feeds these first and second input tagged sentences to continuebridge 405.

An invocation of continuebridge 405 on topbridgefrom, bridgefrom, bridgetos, path, and connectives starts by setting path1 to a copy of path. It appends bridgefrom to the end of path1. If the length of path1 is greater than MAXPATHLEN, then it returns an empty list. It sets result to the empty list. For each element bridgeto in bridgetos, if the result of invoking tomatch 407 on bridgefrom and bridgeto is SUCCESS, then it appends <topbridgefrom, bridgeto, path1, connectives>to result. For each bridgefrom1 and connective1 in the result of invoking applyrules 409 on bridgefrom, for each bridge in the result of recursively invoking continuebridge 405 on topbridgefrom, bridgefrom1, bridgetos, path1, and connective1 appended to a copy of connectives, it appends bridge to result. It returns result. MAXPATHLEN is set to 4. In other words, in this process continuebridge 405 applies rules to first input or inferred tagged sentences to produce new tagged sentences and recursively invokes itself 405 on those new tagged sentences until tagged sentences match tagged second input sentences.

An invocation of tomatch 407 on tagged sentences bridgefrom and bridgeto proceeds as follows: If the length of bridgeto is less than the length of bridgefrom, it returns FAILURE. It sets i to 0. While i is less than the length of bridgefrom, (a) if the result of invoking isa 415 on LexToCon(bridgeto[i]) and LexToCon(bridgefrom[i]) is false and the part of speech of bridgeto[i] is not equal to Pronoun, then it returns FAILURE, and (b) it sets i to i+1. It returns SUCCESS. In other words, in this process tomatch 407 determines whether two tagged sentences match each other.

An invocation of applyrules 409 on tagged sentence s starts by setting result to the empty list. For each rule in the rule base, it sets retcode and bd to the result of invoking match 411 on the left pattern of rule and s. If retcode equals SUCCESS, then it appends to result (a) the result of invoking instan 413 on the right pattern of rule and bd, and (b) the connective of rule. It returns result. In other words, in this process applyrules 409 determines which rules apply to a tagged sentence, applies them, and returns the new tagged sentences resulting from the application of the rules.

An invocation of match 411 on pattern p and tagged sentence s proceeds as follows, if the length of s is less than the length of p, then it returns FAILURE. It sets bd to the empty map. It sets i to 0. While i is less than the length of p, (a) if the result of invoking isa 415 on LexToCon(s[i]) and LexToCon(p[i]) is false and the part of speech of s[i] is not Pronoun, then it returns FAILURE, (b) if p[i] has an optional variable, then it sets bd (variable of p[i]) to c[i], and (c) it sets i to i+1. It returns SUCCESS and bd. In other words, in this process match 411 determines whether a pattern matches a tagged sentence and returns the bindings that enabled the match to succeed.

An invocation of instant 413 on pattern p and bindings bd starts by setting result to the empty list. For each pe in p, if pe has an optional variable and the variable of pe has a value in bd, then it appends to r the value in bd of the variable of pe, otherwise it appends to r the lexical entry of pe. It returns result. In other words, instan 413 takes bindings resulting from match 411 and a pattern, and produces a new tagged sentence.

The operation isa(a,b) 415 is defined recursively as follows: if a=b, isa(a,b) is true; otherwise, if there is a concept c such that c is an element of Parent(a) and isa(c,b), isa(a,b) is true; otherwise, isa(a,b) is false. In other words, isa 415 determines whether one concept is a kind of another concept (e.g., ALCOHOL2 219 is a FOOD 215).

Given a character string fromstring, predict(fromstring) 403 returns a list of predictions, where each prediction comprises a predictfrom, predictto, and connective. A predictfrom is a tagged sentence. A predictto is a tagged sentence. Predictfrom is fromstring disambiguated as to word sense. An invocation of predict 403 on fromstring starts by setting result to the empty list. For each predictfrom in the result of invoking tag 417 on fromstring, for each predictto and connective in the result of invoking applyrules 409 on predictfrom, it appends predictfrom, predictto, and connective to result. It returns result. In other words, predict 403 invokes tag 417 on the input sentence to produce input tagged sentences and then applies rules to those tagged sentences to produce new tagged sentences representing predictive inferences.

FIG. 5 is a drawing of sample bridging inference output using rules such as those of FIG. 3. FIG. 5 shows a bridging inference produced by bridge 401 given the input character strings "Bill drank vodka" 501 and "He put an ice pack on his head" 509. The rules that are used in the inference are 503, 505, and 507. FIG. 3 is a detail of rule 503. The bridging inferences are 504 and 506. The disambiguated inputs are 502 and 508.

In other words, FIG. 5 illustrates one example of how the invention [0001] applies the Lexicon and Ontology 101 (as shown in FIG. 2) to a first input sentence 501 to produce a first input tagged sentence 502. The invention then matches the first input tagged sentence 502 to first rule 503 (as shown in FIG. 3) from the rule base 103 using applyrules 409 which is invoked by continuebridge 405 (as shown in FIG. 4).

Next, the invention generates first inferred tagged sentences 504 from the rules 503 as shown above under continuebridge, which recursively invokes itself until a maximum path length is reached or no rules apply. In a similar manner to that shown above, the invention then matches the first inferred tagged sentences 504 to second rules 505 and generates second inferred tagged sentences 506 from the second rules 505. This process can repeat itself many times as shown in items 507 and 508.

The invention eventually finds a series of rules and inferred sentences that result in the desired second sentence 509. The invention conducts a depth-first search, limited by a maximum path length, in order to find all valid bridging inference chains from the first input sentence to the second input sentence. The depth-first search is conducted by the continuebridge operation 405. Upon finding the appropriate series of rules and inferred sentences, the invention combines the rules and inferred sentences as a bridging inference path. This is done progressively by continuebridge 405. Specifically, each time continue bridge is invoked it makes a copy of the path and adds the current bridgefrom to the path. Whenever a match is found, it returns the path that has been built up to that point.

As mentioned above, besides establishing bridging inferences between two or more sentences, the invention also produces predictive inferences from a single sentence. For example, FIG. 6 shows an example of the predictive inference process using rules such as those shown in FIG. 3. FIG. 6 shows an output predictive inference produced by the predict process 403 (discussed above with respect to FIG. 4) given the "Bill drank vodka" 601 input. The rule that is used in the inference is 603. The disambiguated input is 602. The predictive inference is 604. In this embodiment, the invention chooses all matching rules. This is different than in the bridge case, because there is no second input sentence to constrain the results. However, this is mitigated by the fact that only one level of rule application is performed in predictive inference, so not many inferences will be generated.

In one embodiment, bridge 401 generates bridging inferences comprising any possible sequence of connectives, up to the arbitrarily established maximum path length (MAX-PATHLEN). In an additional embodiment, bridging inferences are further restricted to being composed only of the following sequences of connectives: a. triggers→, has-plan, b. triggers→has-plan→has-plan, c. triggers→has-plan→has-plan→has-plan, d. causes→triggers→has-plan, e. causes→triggers→has-plan→has-plan, f. triggers→causes, g. triggers→has-plan→causes, h. has-plan→causes. This additional restriction is accomplished, for example, by modifying continuebridge to return an empty result if the proposed connective is not one of the above connective sequences. With the invention a maximum path length is imposed to filter out inferences that are probably unlikely given a speaker's likelihood not to leave such remote connections unstated. A restriction on the sequence of connectives might be included to filter out specific cases of unlikely inferences, such as a long sequence of causes connectives. For example, in "Jim was hungry"—"He ate an apple", the connection is probably not Jim was hungry, which made him tired, which made him fall asleep, which made him dream about an apple, which made him eat an apple the next morning when he woke up.

Figure 7:
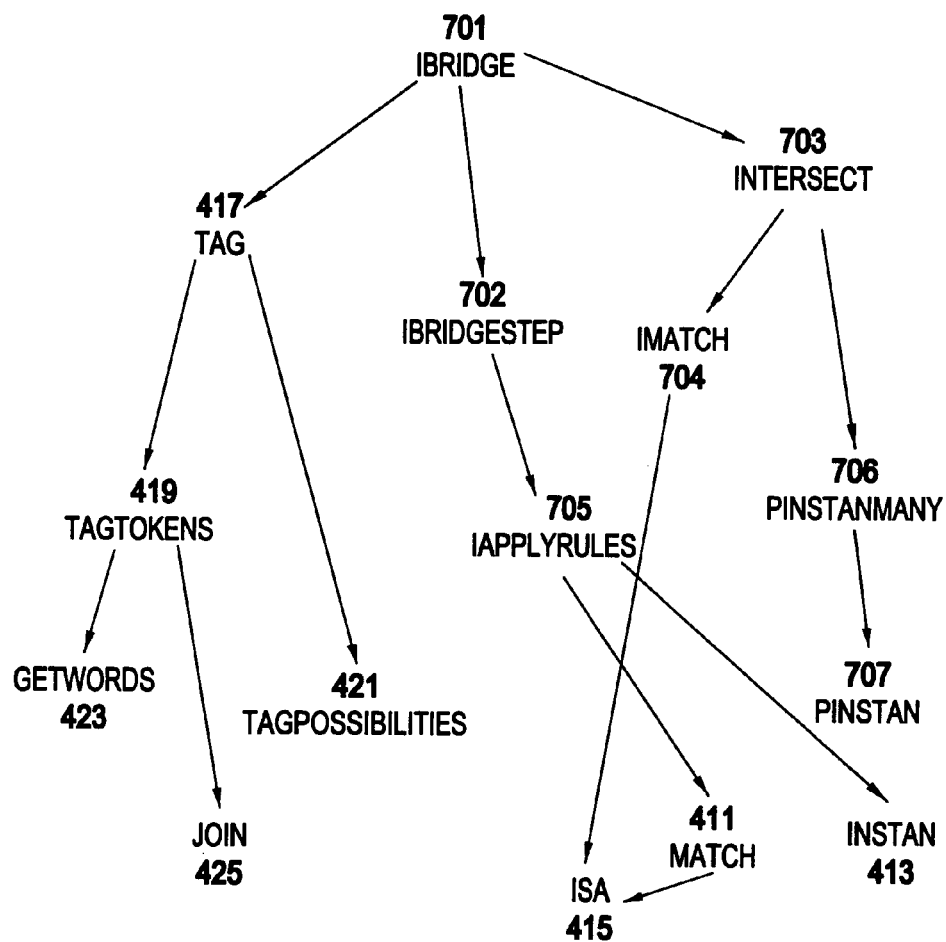
FIG. 7 is a drawing of the procedures in the bidirectional search embodiment of the invention.

In another embodiment, the invention performs a bidirectional breadth-first search. More specifically, as shown in FIG. 7, ibridge 701 generates bridging inferences. Ibridge 701 invokes tag 417, ibridgestep 702, and intersect 703. Tag 417 invokes tagtokens 419 and tagpossibilities 421. Tagtokens 419 invokes getwords 423 and join 425. Ibridgestep 702 invokes iapplyrules 705. Iapplyrules 705 invokes match 411 and instan 413. Intersect 703 invokes pinstanmany 706. Pinstanmany 706 invokes pinstan 707. Match 411 invokes isa 415. In other words, Ibridge 701 performs a bidirectional breadth-first search to generate bridging inferences. Ibridge 701 alternates between invoking ibridgestep 702 on tagged sentences resulting from the first input sentence, and invoking ibridgestep 702 on tagged sentences resulting from the second input sentence. Ibridgestep 702 applies rules to tagged sentences to produce new tagged sentences. Intersect 703 detects matches between tagged sentences derived from the first input sentence and tagged sentences derived from the second input sentence. Whenever it find a match, it constructs a complete bridging inference path from the first input sentence to the second input sentence. Iapplyrules 705 determines which rules match a tagged sentence, applies those rules to the tagged sentence, and returns the new tagged sentences that result from the application of those rules. When applying rules to tagged sentences derived from the first input sentence, iapplyrules 705 invokes match 411 on the left pattern of a rule and upon finding a match invokes instan 413 on the right pattern of the rule to generate new tagged sentences. While, when applying rules to tagged sentences derived from the second input sentence, iapply rules 705 invokes match 411 on the right pattern of the rule and, upon finding a match, invokes instan 413 on the left pattern of the rule to generate new tagged sentences. Pinstanmany 706 takes a path of tagged sentences and bindings from imatch and produces a new path of tagged sentences. Pinstan 707 takes a tagged sentence and bindings and produces a new tagged sentence.

In FIG. 4, unidirectional depth-first search starting from the first input sentence is performed, while in FIG. 7, bidirectional breadth-first search is performed starting from the first input sentence on one side and the second input sentence on the other.

Figure 8:
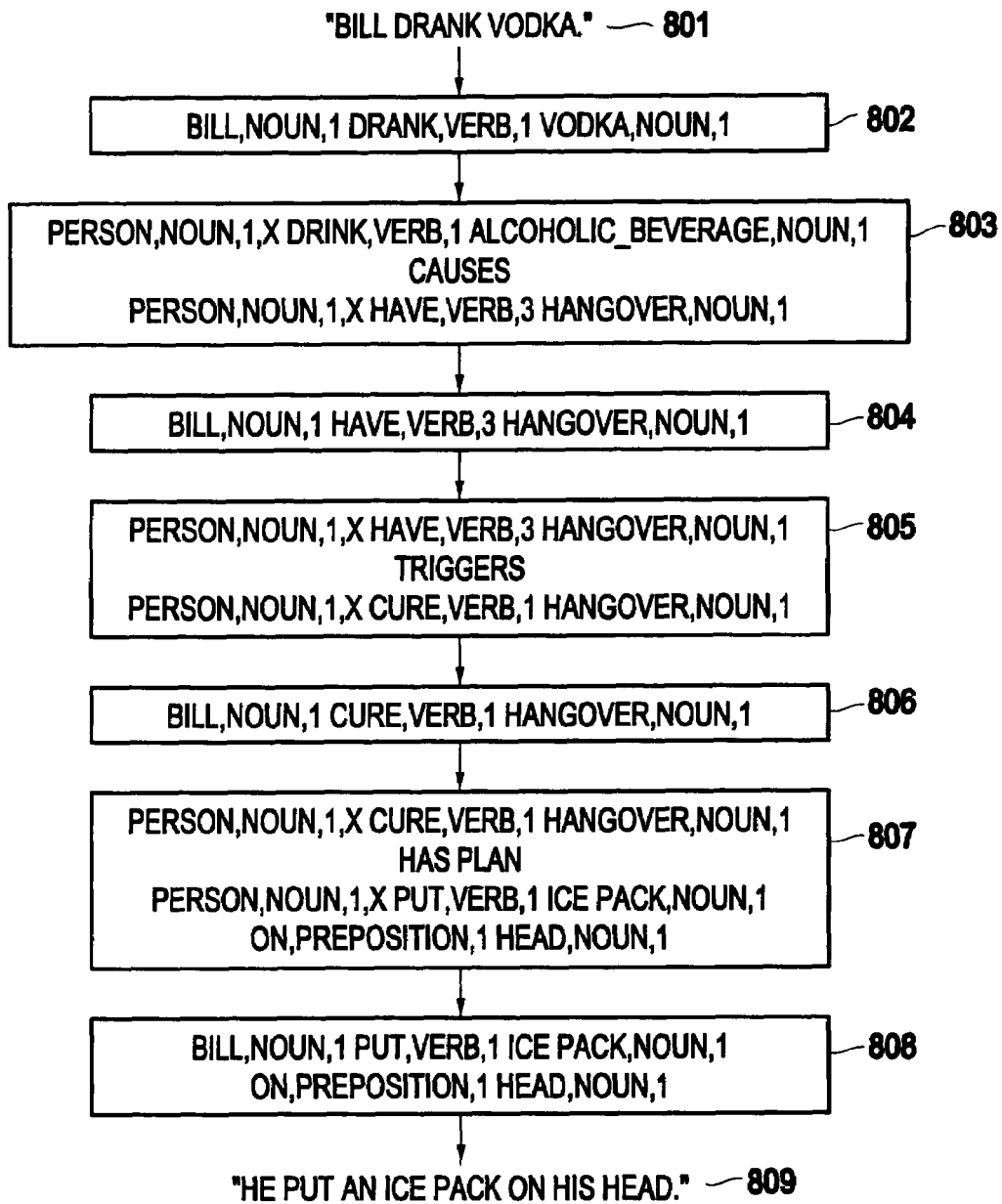
FIG. 8 is a drawing of sample data structures involved in a bridging inference in the bidirectional search embodiment of the invention.

FIG. 8 is an example of the bidirectional processing using rules such as those of FIG. 3. FIG. 8 shows an output bridging inference produced by ibridge 701 given the input character strings "Bill drank vodka" 801 and "He put an ice pack on his head" 809. The rules that are used in the inference are 803, 805, and 807. The bridging inferences are 804 and 806. The disambiguated inputs are 802 and 808.

The processing shown in FIG. 8 is similar to that shown in FIG. 6, discussed above, except that the search process proceeds bidirectionally starting from 801 and 809 until two paths are found that meet at bridging inference 806. The combination of the two paths is a complete path from 801 to 809. In other words, this embodiment of the invention automatically produces bridging inferences that join two related input sentences. This embodiment starts as before by applying the Lexicon and Ontology to the first input sentence to produce first input tagged sentences and applying the Lexicon and Ontology to the second input sentence to produce second input tagged sentences. But in this embodiment, it proceeds by alternating between applying rules starting from first input tagged sentences, proceeding downward, and starting from second input tagged sentences, proceeding upward, until a tagged sentence generated by the downward search matches a tagged sentence generated by the upward search. That is, the invention applies rules to first input tagged sentences, producing more tagged sentences. Then the invention applies rules to second input tagged sentences, producing more tagged sentences. Then the invention applies rules to the tagged sentences resulting from applying rules to first input tagged sentences. Then the invention applies rules to the tagged sentences resulting from applying rules to the second input tagged sentences, and so on. Whenever a match is found between a tagged sentence deriving from a first input tagged sentence, and a tagged sentence deriving from a second input tagged sentence, the corresponding bridging inference path is added to a list of results. Upon reaching MAXPATHLEN, the search is terminated and the results are returned.

The invention is useful for computer applications, such as online and standalone applications, that incorporate natural language interactions with a user. The invention enables bridging and predictive inferences to be made that are useful for understanding the customer's situation in order to provide useful responses such as retrieved information or recommended products, services, and solutions. The invention enables the user's goals to be inferred that allow an application to retrieve information and suggest products useful for satisfying those goals.

The invention is useful in computer applications for disambiguating part of speech and word sense in a natural language interaction with a user to understand what particular item the user is requesting. The invention is useful in computer applications for disambiguating coreference in a natural language interaction with a user to determine what the user is referring to when the user employs anaphoric references such as "it" and "they."

While the invention has been described in terms of preferred embodiments, those skilled in the art will recognize that the invention can be practiced with modification within the spirit and scope of the appended claims.

What is claimed is:

1. A method of automatically producing bridging inferences that join two related input phrases, said method comprising:
   applying a lexicon and ontology data structure to a first input phrase to produce a first tagged input phrase;
   matching said first tagged input phrase to first rules;
   generating first inferred phrases from said first rules;
   matching said first inferred phrases to second rules;
   generating second inferred phrases from said second rules;
   applying said lexicon and ontology data structure to a second input phrase to produce a second tagged input phrase;
   selecting a first rule of said first rules and a second rule of said second rules that causes a second inferred phrase of said second inferred phrases to match said second tagged input phrase; and
   recording, as a bridging inference path, said first rule and said second rule, wherein said first rule and said second rule each comprise a pattern element comprising a lexical entry and an optional variable.

2. The method in claim 1, further comprising providing disambiguated natural language rules.

3. The method in claim 1, further comprising providing rules that are disambiguated as to part of speech, word sense, and coreference.

4. The method in claim 1, further comprising providing rules having:
   a first portion;
   a connector; and
   a second portion.

5. The method in claim 4, further comprising providing connectors comprising one of "causes," "triggers," and "has-plan."

6. The method in claim 4, wherein said matching of said first tagged input phrase to first rules comprises matching said first tagged input phrase to said first portion of ones of said first rules, and said first inferred phrases comprise said second portion of matched ones of said first rules.

7. The method in claim 1, further comprising providing said lexicon and ontology data structure to have one or more lexical entries, concepts, and character strings.

8. The method in claim 1, further comprising providing said lexicon and ontology data structure to have:
   maps from said character strings to said lexical entries;
   maps from said lexical entries to said concepts;
   maps from said concepts to said lexical entries; and
   maps from said concepts to said concepts.

9. A method of automatically producing predictive inferences from an input phrase, said method comprising:
   applying a lexicon and ontology data structure to said input phrase to produce a tagged input phrase;
   matching said tagged input phrase to rules;
   generating inferred phrases from said rules, wherein said rules comprise a pattern element comprising a lexical entry and an optional variable.

10. The method in claim 9, further comprising providing said rules as disambiguated natural language rules.

11. The method in claim 9, further comprising providing said rules such that said rules are disambiguated as to part of speech, word sense, and coreference.

12. The method in claim 9, further comprising providing said rules to have:
a first portion;
a connector; and
a second portion.

13. The method in claim 12, further comprising providing connectors comprising one of "causes," "triggers," and "has-plan."

14. The method in claim 12, wherein said matching of said tagged input phrase to said rules comprises matching said tagged input phrase to said first portion of ones of said rules, and said inferred phrases comprise said second portion of matched ones of said rules.

15. The method in claim 9, further comprising providing said lexicon and ontology data structure to have one or more lexical entries, concepts, and character strings.

16. The method in claim 9, wherein said lexicon and ontology data structure comprises:
maps from said character strings to said lexical entries;
maps from said lexical entries to said concepts;
maps from said concepts to said lexical entries; and
maps from said concepts to said concepts.

17. A computer system with at least one memory and at least one central processing unit, said computer system having a lexicon and ontology data structure and a rule base data structure, each stored in said memory, wherein said lexicon and ontology data structure comprises:
at least one lexical entry, concepts, and character strings;
a first map from said character strings to said lexical entries;
a second map from said lexical entries to said concepts;
a third map from said concepts to said lexical entries; and
a fourth map representing a parent relationship from said concepts to said concepts,
wherein each lexical entry comprises a character string, part of speech, and sense number,
wherein each concept comprises a character string,
wherein said rule base data structure comprises at least one rules,
wherein said rule includes a left pattern, a connective, and a right pattern,
wherein a pattern comprises a list of pattern elements, and
wherein a pattern element comprises a lexical entry and an optional variable.

18. The computer system, as in claim 17, wherein said central processing unit is adapted to take, as input, a first input sentence and a second input sentence and produce, as output, at least one bridging inference path, each comprising a sequence of inferred tagged sentences, by finding at least one sequence of inferred tagged sentences in said rule base such that:
a first inferred tagged sentence in the bridging inference path results from application of a rule of said rules to said first input tagged sentence;
for a second inferred tagged sentence through a last inferred tagged sentence in the bridging inference path, each inferred tagged sentence in the bridging inference path results from application of one of said rules to a previous inferred tagged sentence in the bridging inference path; and
said last inferred tagged sentence in the bridging inference path matches said second input tagged sentence.

19. The computer system, as in claim 18, wherein said central processing unit conducts a unidirectional search from said first input sentence to said second input sentence.

20. The computer system, as in claim 18, wherein said central processing unit conducts a bidirectional search from said first input sentence to said second input sentence.

21. The computer system, as in claim 17, wherein said central processing unit is adapted to take, as input, one sentence and produce, as output, predictive inferences by applying rules to said input sentence such that:
a left pattern of a rule matches the input sentence; and
an output predictive inference comprises a right pattern of said rule instantiated with a connective that match said left pattern of said rule to said input sentence.

22. The computer system, as in claim 21, wherein said connective comprises one of causes, triggers, or has-plan.

23. A computer system with at least one memory and at least one central processing unit, said computer system having a lexicon and ontology data structure and a rule base data structure, each stored in said memory, wherein said lexicon and ontology data structure comprises:
at least one lexical entry, concepts, and character strings,
wherein each lexical entry comprises a character string, part of speech, and sense number,
wherein each concept comprises a character string,
wherein said rule base data structure comprises at least one rules,
wherein said rule includes a left pattern, a connective, and a right pattern,
wherein a pattern comprises a list of pattern elements, and
wherein a pattern element comprises a lexical entry and an optional variable.

24. The computer system, as in claim 23, wherein said central processing unit is adapted to take, as input, a first input sentence and a second input sentence and produce, as output, at least one bridging inference path, each comprising a sequence of inferred tagged sentences, by finding at least one sequence of inferred tagged sentences in said rule base such that:
a first inferred tagged sentence in the bridging inference path results from application of a rule of said rules to said first input tagged sentence;
for a second inferred tagged sentence through a last inferred tagged sentence in the bridging inference path, each inferred tagged sentence in the bridging inference path results from application of one of said rules to a previous inferred tagged sentence in the bridging inference path; and
said last inferred tagged sentence in the bridging inference path matches said second input tagged sentence.

25. The computer system, as in claim 24, wherein said central processing unit conducts a unidirectional search from said first input sentence to said second input sentence.

26. The computer system, as in claim 24, wherein said central processing unit conducts a bidirectional search from said first input sentence to said second input sentence.

27. The computer system, as in claim 23, wherein said central processing unit is adapted to take, as input, one sentence and produce, as output, predictive inferences by applying rules to said input sentence such that:
a left pattern of a rule matches the input sentence; and
an output predictive inference comprises a right pattern of said rule instantiated with a connective that match said left pattern of said rule to said input sentence.

28. The computer system, as in claim 27, wherein said connective comprises one of causes, triggers, or has-plan.

* * * * *